United States Patent
Benning

[11] 3,937,290
[45] Feb. 10, 1976

[54] APPARATUS FOR MANEUVERING AIRCRAFT

[75] Inventor: Vernon A. Benning, Maidenhead, England

[73] Assignee: M. L. Aviation Company Limited, England

[22] Filed: July 12, 1974

[21] Appl. No.: 488,812

[30] Foreign Application Priority Data
Sept. 17, 1973 United Kingdom............... 43499/73

[52] U.S. Cl.................. 180/14 C; 180/74; 180/6.44
[51] Int. Cl.².......................................... B60D 1/00
[58] Field of Search ......... 180/14 R, 14 C, 14 I, 74, 180/6.44

[56] References Cited
UNITED STATES PATENTS

| | | | |
|---|---|---|---|
| 2,695,718 | 11/1954 | Epps | 180/14 C |
| 2,751,990 | 6/1956 | Finlay et al. | 180/14 C |
| 2,763,164 | 9/1956 | Neklutin | 180/6.44 X |
| 2,869,662 | 1/1959 | Koup | 180/14 E |
| 2,957,650 | 10/1960 | Horan et al. | 180/14 R X |
| 2,966,222 | 12/1960 | Lambert | 180/14 R X |
| 3,025,922 | 3/1962 | Savidge | 180/14 R |
| 3,063,512 | 11/1962 | Yadon | 180/14 R |

Primary Examiner—Kenneth H. Betts
Assistant Examiner—R. Schrecengost
Attorney, Agent, or Firm—Brisebois & Kruger

[57] ABSTRACT

An aircraft handler for use with twin nosewheeled aircraft comprises a frame for fitting to the wheel-supporting structure of the aircraft, a pair of driving drums mounted to turn in the frame, for frictional engagement with respective wheels of the aircraft, a source of power providing independent drive to the two drums and a separate control unit connected to the frame by a flexible connection, by means of which the two drums may be controlled. The source of power may comprise a pair of independently-controllable electric motors operated by separate controls in the control unit, these conveniently being mounted on the frame and the flexible connection supplying signals to the motors from the control unit.

Alternatively each drum may be driven by a separate, independently-controlled hydraulic motor mounted on the frame.

2 Claims, 7 Drawing Figures

APPARATUS FOR MANOEUVRING AIRCRAFT

This invention relates to apparatus for manoeuvring aircraft on the groud, commonly referred to as an aircraft "handler." One form of such handler is shown in British Patent Specification Nos. 845105 and 909697 and is constructed as a small self-propelled vehicle which includes a driving roller for engagement with one of the wheels of an aircraft. Rotation of this driving roller turns the aircraft wheel and gradually manoeuvres the aircraft. Such a handler is capable of manoeuvring the largest aircraft, but since it is necessary to engage one of the main load-bearing wheels of the aircraft which will usually not lie on the centre-line of the aircraft, there is a tendency for the aircraft to turn in one direction or the other and in any case a separate operator is required to steer the nose wheel or tail wheel.

A handler of this type may also be used for quite light, twin-nose-wheeled aircraft such as helicopters, but is less suitable for this purpose in circumstances of extremely confined space, and where men and equipment in the immediate close vicinity of the aircraft is a disadvantage. There is thus a requirement for a handler which is specifically designed for the manoeuvring of light/medium, twin-nose-wheeled aircraft.

According to the present invention, a handler for this purpose comprises a frame fitting to the wheel-supporting structure of the aircraft, a pair of driving drums mounted to turn in the frame, for frictional engagement with respective wheels of the aircraft, a source of power providing independent drive to the two drums and a separate control unit connected to the frame by a flexible connection, by means of which the two drums may be controlled. Once the frame has been fitted to the wheel-supporting structure with the driving drums in egagement with the tyres of the aircraft wheels, the aircraft can be readily manoeuvred without effort or even movement by the operator merely be operation of the controls for the two drums. These control the relative speeds of rotation of the two wheels of the aircraft and thus enable it to be steered as required, the only limitation on the range of movement being imposed by the length of the flexible connection between the control unit and the frame.

Preferably the source of power comprises a pair of independently-controllable electric motors operated by separate controls in the control unit. Most simply, the motor may be mounted on the frame so as to drive the drums directly, the flexible connection supplying signals to the motors from the control unit. With such an arrangement, both electric motors may drive through differentials, one supplying driving power to both drums and the other providing additional drive for steering purposes. As an alternative, each drum may be driven by a separate, independently-controlled hydraulic motor mounted on the frame. These hydraulic motors may be supplied with hydraulic fluid from respective pumps located in the control unit and driven by electric motors also in the control unit. In some circumstances, a single electric motor may be used to drive both pumps, the supply of hydraulic fluid then being controlled by control of the respective pumps rather than by control of the electric motor. Another alternative is for the pumps and also the electric motor or motors to be mounted on the frame in close associated with the hydraulic motors. This avoids the need for differentials which are required when the driving drums are driven directly from an electric motor without the intermediary of hydraulic pumps and motors.

When the electric motor or motors is mounted on the frame, the control unit itself may be quite light since it includes only the control equipment which produces control signals passed to the motor or motors through the flexible connection. A control unit such as this may be slung on the chest of the operator who may thus walk alongside the aircraft as it is being manoeuvred. Under these conditions, the power supply to the electric motor may be derived from batteries mounted either on the frame or in the aircraft or may be taken from a stationary external supply. It is also possible for the batteries to be mounted in the control unit, but this then renders the unit too heavy to be carried by the operator and the unit then needs to rest on the ground or on the structure of a ship. The same also applies if the control unit includes an electric motor or motors driving hydraulic pumps supplying hydraulic fluid through the flexible connection to respective hydraulic motors on the frame.

The mounting for the driving drums is preferably slidable on the frame so as to move the drums between an operative position in engagement with the wheels of the aircraft and a retracted position. In order to facilitate movement of the frame, it may be provided with pairs of ground wheels and by arranging that one of these pairs of wheels is engaged by the drums in their retracted position, the drums are enabled to drive the ground wheels so that the frame constitutes a self-propelled unit operated and controlled from the control unit.

As mentioned originally, the frame needs to be fitted to the wheel-supporting structure of the aircraft and this may conveniently be achieved by means of retractable spigots engaging sockets in the hubs of the wheels. The frame is then capable of turning about these spigots under the effects of the torquereactions produced by the driving torque and the weight of the frame. These torque-reactions need to be resisted by respective pressure pads engaging the wheel-supporting structure.

Constructions of aircraft handler in accordance with the invention will now be described in more detail, by way of example, with reference to the accompanying drawings, in which.

Figure 1:
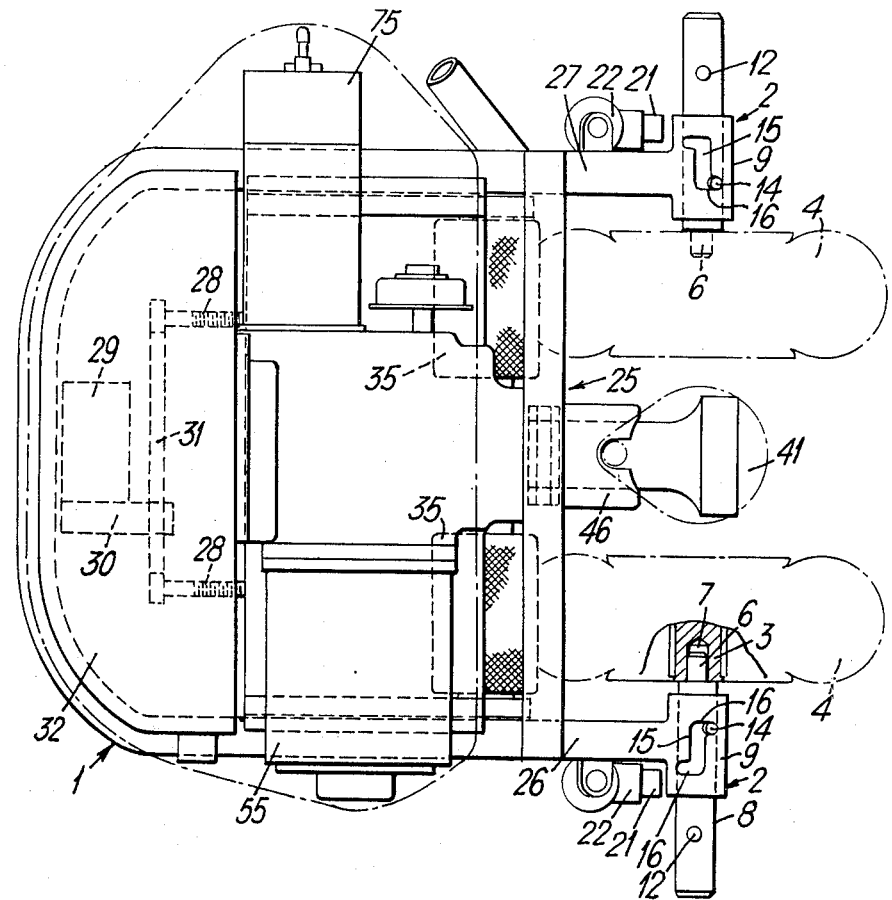
FIG. 1 is a plan view of one form of handler in which the drive is produced by electric motors mounted on the frame of the handler.

Turning first to the construction shown in FIGS. 1 to 4, the handler comprises basically a frame 1 in the form of a generally U-shaped outer member braced by crossmembers. The frame is fitted to the wheel-supporting structure of an aircraft by means of spigot connections shown generally as 2 located at the ends of the limbs of the U of the frame and engaging the hubs 3 of the wheels of the aircraft which are shown as 4. Each connection 2 comprises a spigot 6 which fits into a corresponding socket 7 in the respective hub 3. Each spigot 6 is formed as an extension of a rod 8 of larger diameter, which is capable of being slid axially within a tubular portion 9 at the end of each of the limbs of the U. Each rod 8 is operated manually by means of a handle 12 and is capable of being locked in either of its two extreme positions by means of a transverse pin 14 which slides in a slot 15 in the respective tubular portion 9 and is capable of being locked in either extreme position by rotation of the rod 8 to bring the pin 14 into a transverse portion 16 at each end of the slot 15. As a result of these connections, it is a simple matter to fit the frame 1 to the wheels 4 of the aircraft.

The frame 1 is fitted with pairs of ground wheels 20 and 21, the latter being mounted for castering action by means of a bracket 22. The frame 1 also supports a carriage 25 which is mounted for sliding movement on side members 26 and 27 of the frame 1. The sliding movement is controlled by means of a pair of feed screws 28 driven from an electric motor 29 by way of gearing indicated diagrammatically as 30 and 31. These last-mentioned components are shown in dotted lines in FIG. 1 since they are enclosed by a cover 32. The action of the feed screws 28 is to slide the carriage 25 between an operative position shown in full lines in FIG. 3 and a retracted position shown partially in dotted lines as 25' in FIG. 3, to the left of the full line position.

Figure 2:
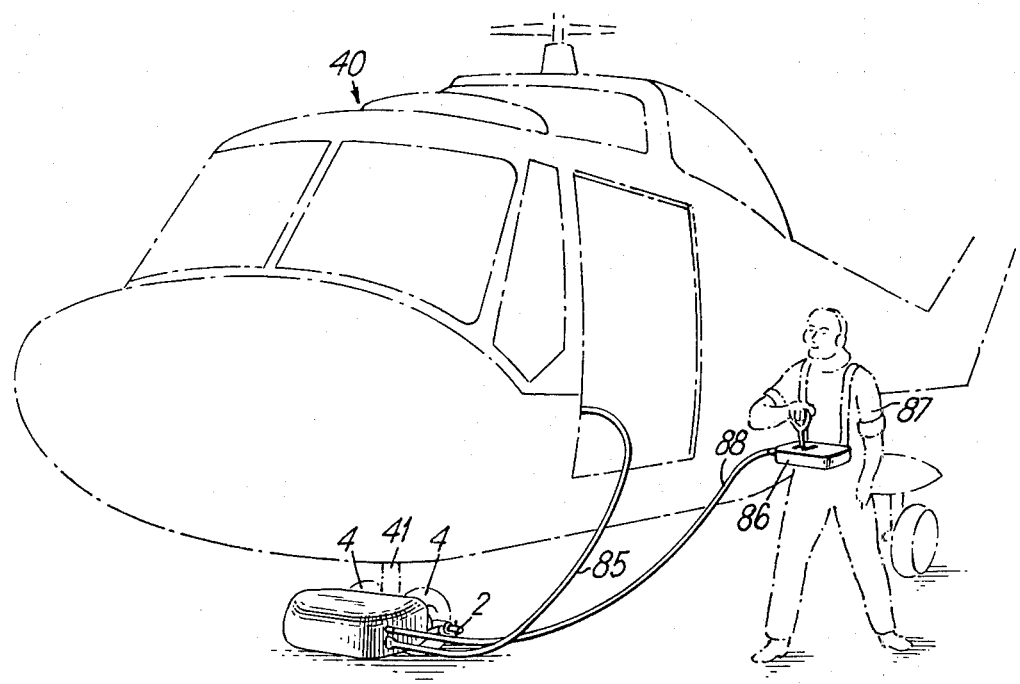
FIG. 2 is a perspective view showing the handler of FIG. 1 in operation when fitted to an aircraft.
Figure 3:
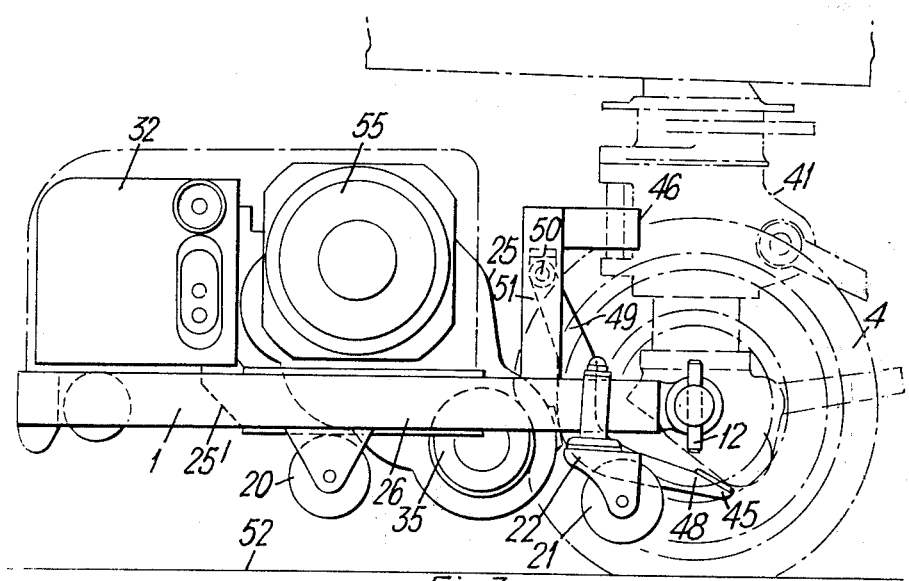
FIG. 3 is an elevation corresponding to FIG. 1.

In the operative position shown in FIG. 1 and in full lines in FIG. 3, driving drums 35 are in frictional engagement with the wheels 4 of the aircraft, the tyres being shown indented in FIG. 3 by this engagement. In the retracted position, the drums 35 engage the respective ground wheels 20 so that, when drive is applied to the drums 35, the wheels 20 are driven and the handler as a whole is selfpropelled. The handler may thus be moved up to an aircraft under its own power and then fitted in position. The first operation is to fit the spigot connections 2 to the wheels 4 of the aircraft as already described. FIGS. 2 and 3 show the handler fitted to a helicopter 40, the oleo leg of which is shown as 41. When the spigot connections 2 have been attached to the wheels of the aircraft, the carriage 25 is moved to its operative position under the control of the motor 29. This brings pressure pads 45 and 46 into engagement with the bottom and side respectively of the oleo leg 41. The pressure pad 45 is mounted at the end of a toe-portion 48 at the lower end of an arm 49 pivoted at 50 to an upright member 51 forming part of the carriage 25 and which carries the pressure pad 46 at its upper end.

In order to fit the spigot connections 2 to the wheels 4, the wheels 21 need to be lifted from the ground to approximately the position shown in FIG. 3, but at this stage the wheels 20 are still resting on the ground and supporting a proportion of the weight of the handler as a whole. The pressure pad 45 is located firmly against the bottom surface of the oleo 41 and is therefore not moved by movement of the carriage 25 to its operative position, i.e. to the right as seen in FIG. 3. The pivot point 50 is, however, moved to the right with the remainder of the carriage and the arm 49 is thus caused to turn about the point of engagement between the pressure pad 45 and the bottom of the oleo leg 41. As a result, the handler as a whole is lifted to the position of FIG. 3 with the ground wheels 20 clear of the ground, indicated as 52 and this movement continues until the pressure pad 46 comes into firm engagement with the side of the oleo leg 41. The motor 29 is then stopped and the handler is thus locked securely in position to the wheel-supporting structure of the helicopter 40. The pressure pads 45 and 46 between them provide torque reaction for both directions of rotation. The pad 45 resists the anticlockwise reaction caused by the weight of the handler, and the pad 46 resists the clockwise reaction from the torque applied by the driving drums 35 to the wheels 4 in driving the helicopter 40.

Figure 4:
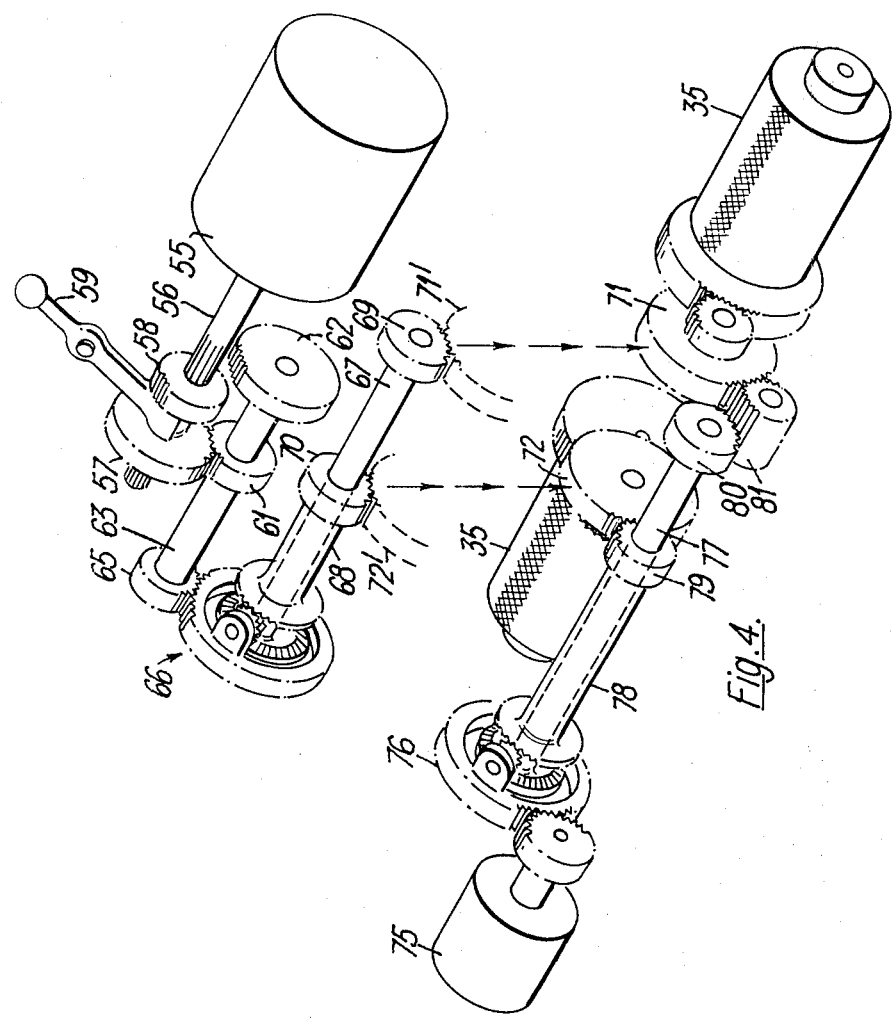
FIG. 4 is a partially-exploded view of the mechanical driving arrangements for the handler shown in FIGS. 1 and 3.

The drive to the drum 35 may best be understood by reference to FIG. 4 which shows the driving arrangements in isolation and partially exploded for clarity. The drive is obtained from a driving motor 55 having an output shaft 56 fitted with gear wheels 57 and 58 which are splined to the shaft 56 and are capable of sliding on the shaft under the control of a handle 59. The gear wheels 57 and 58 are alternatively engageable with gear wheels 61 and 62 on a lay shaft 63, according to the position of the handle 59. The position shown in FIG. 4 leads to a high ratio drive, while movement of the handle 59 to engage the gear wheels 58 and 62 gives low ratio drive. The lay shaft 63 is fitted with a further gear wheel 65 which provides the input to a differential 66. The two separate outputs from the differential 66 are by way of shafts 67 and 68, the former passing through the centre of the latter which is tubular. The two output shafts have gear wheels 69 and 70 respectively which mesh with further respective gear wheels 71 and 72 which, in their turn, drive the two drums 35. The drawing is exploded at the point of engagement between gear wheels 69 and 70 and the respective gear wheels 71 and 72, the latter being partially duplicated at 71' and 72'.

As so far described, this is a normal differential drive between the motor 55 and two drums 35, enabling the drums to turn at different speeds when negotiating corners. Steering control is exerted by a secondary or steering motor 75 which drives through a differential 76, the output of which is by way of shafts 77 and 78, the former passing through the hollow centre of the latter as with the shafts 67 and 68. The shaft 78 drives the gear wheel 72 directly by way of a gear wheel 79, but the shaft 77 drives indirectly by way of gear wheels 80 and 81 so that the direction of drive is reversed.

If the driving motor 55 is operating, but the steering motor 75 is stationary, the shafts 77 and 78 will be driven from the gear wheel 71 and 72, but in opposite directions (owing to the presence of the intermediate gear wheel 81) and these opposite rotations will cancel out in the differential 76. If, under these circumstances, the motor 75 is caused to turn in one direction or the other, it will be understood that drive is superimposed upon the drive from the motor 55, but in opposite directions to the two drums 35. In other words, one drum 35 will be caused to turn more quickly and the other to turn more slowly so as to exert steering control on the handler and hence to the helicopter 40. In other words, the aircraft will be steered in an appropriate direction according to the direction in which the motor 75 turns. The drive just described with reference to FIG. 4 is all mounted on the carriage 25, but only the driving motor 55 and the steering motor 75 are specifically identified in FIG. 1.

The power for driving the motors 55 and 75 is shown in FIG. 2 as being supplied by a flexible connection 85 extending from the helicopter 40, i.e. to supply power from the batteries of the helicopter. In some circumstances, however, the connection 85 may pass to an extenal source of supply either on the ground or on board ship or, if required, batteries can be fitted to the handler itself. Generally speaking, however, the arrangement illustrated in FIG. 2 is the most convenient since it enables a relatively short length of electric cable to be used and enables the handle itself to be of a relatively small, light construction. Apart from the power supply, the motors 55 and 75 need to be controlled so that either motor may run in either direction at a variable speed. This control is exerted from a control unit shown as 86 in FIG. 2. The controls themselves are quite light and enable the unit 86 to be slung on the chest of an operator shown as 87. As previously mentioned, there are separate controls for the two motors indicated by throttle-like control members 88 which can be operated by one hand of the operator who, merely by the combination of a sliding and twisting operation can exert full control over the handler and hence over the helicopter. In this way it is possible to manoeuvre a helicopter or other light, twin-nose-wheeled aircraft in confined spaces and without the need for any men or equipment in the immediate vicinity of the aircraft itself.

Figure 5:
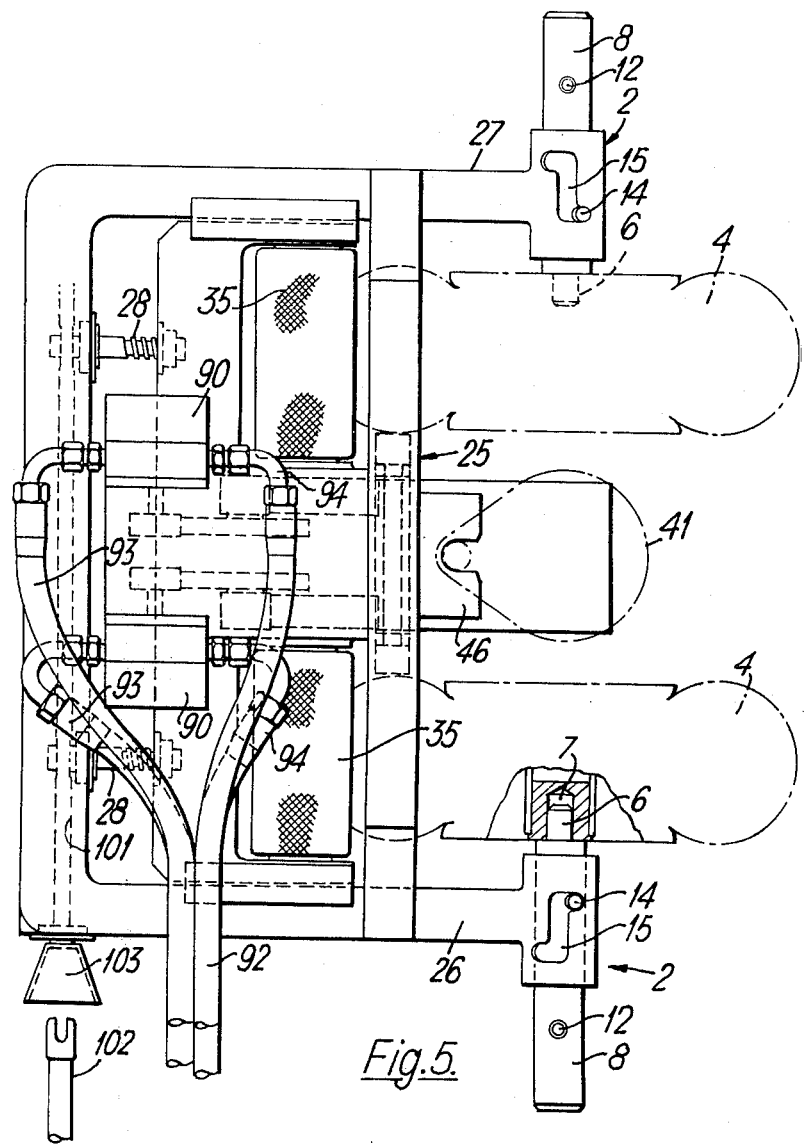
FIG. 5 is a plan view similar to FIG. 1 of an alternative form of handler in which the drive is by way of independently-controlled hydraulic motors.
Figure 6:
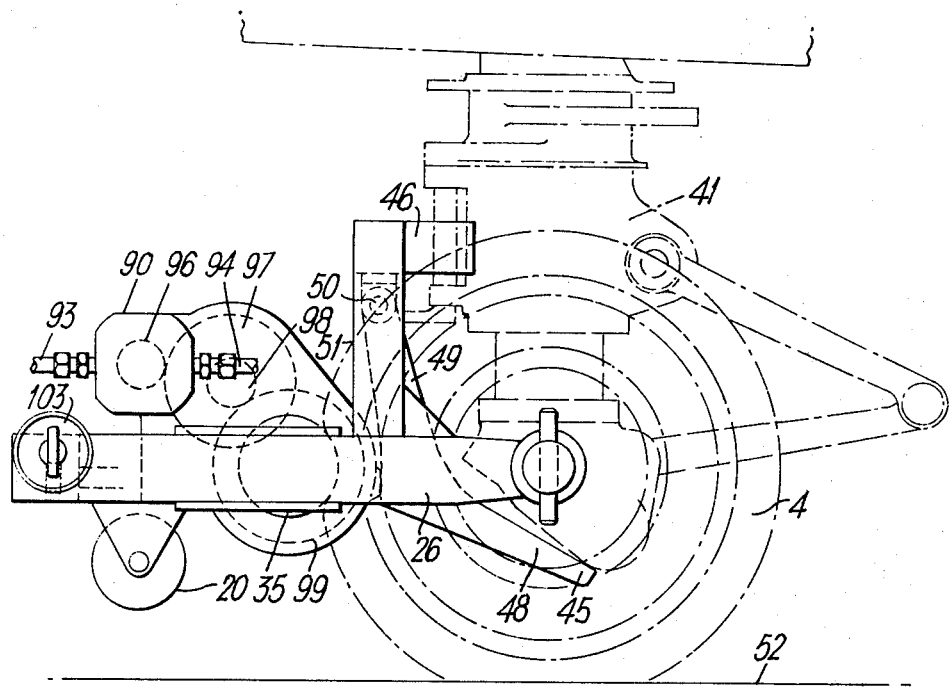
FIG. 6 is an elevation corresponding to FIG. 5.
Figure 7:
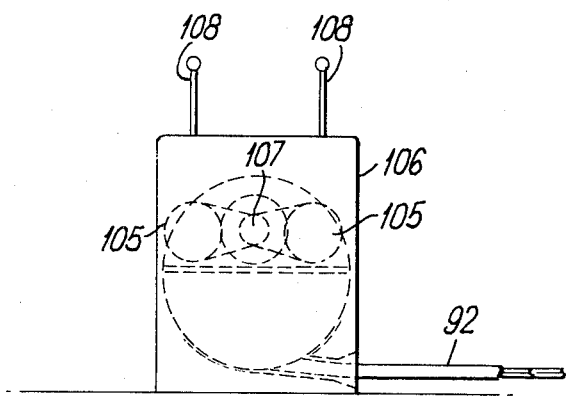
FIG. 7 is a diagrammatic view of a control unit for use with the handler of FIGS. 5 and 6.

The modified construction shown by FIGS. 5 and 7 differs primarily in respect of the source of power for driving the friction drums and insofar as individual parts correspond with those already described with reference to FIGS. 1 to 4, they are identified by the same reference numerals. The basic difference is that the drums 35 are driven by independently controllable hydraulic motors 90 seen in FIGS 5 and 6. These are supplied with hydraulic fluid by means of a flexible connection in the form of a 4-core, high pressure hose shown as 92. The 4-cores comprise a supply line 93 for each motor 90 and a return line 94 also for each motor. Since the motors are independently controlled, there is no need for the differential drive illustrated in FIG. 4 and the mechanical arrangements are therefore considerably simplified in that each motor 90 drives its respective drum 35 by a direct train of gearing 96, 97, 98 and 99. The motors and the gearing are mounted on a carriage similar to the carriage 25, the only minor difference being that sliding movements of the carriage are controlled manually rather than by power. Thus the feed screws 28 are driven from a shaft 101 which is turned manually by means of a key, part of which is shown as 102 and which engages a coupling member 103.

The arrangement of spigot connections and pressure pads are the same in principle as those already described.

A further minor difference lies in the fact that there is only a single pair of ground wheels 20 so that the handler cannot be self-propelled. The hydraulic fluid supplies to the connection 92 is obtained from independently-controllable pumps 105 contained within a control unit shown as 106. As illustrated in FIG. 7, both pumps are driven by a single electric motor 107 and the individual control to the two motors 90 is obtained by corresponding control of the throughput of the pumps 105 by means of control levers 108. As an alternative, the pumps may be driven by separate electric motors, in which case the control can be applied to the motor rather than to the pumps. The inclusion of the motor and the pumps in the control unit means that this is too heavy to be supported by the operator and the unit 106 therefore needs to be free-standing either on the ground or on the deck of a ship and it may be formed with a friction base so as to constitute a firm operating point for the operator. Since both the control unit and the operator need to remain stationary, a correspondingly greater length of flexible connection 92 is required. If required, the control unit 106 may include batteries for driving the motor or motors so that the equipment is completely self-contained. In the construction illustrated in FIG. 7, a connector (not shown) is provided for connecting the unit to a convenient low-voltage mains supply outlet.

If, when operating with hydraulic motors with the consequent simplification of the drive to the drums 35, it is required that the control unit should be portable, the pumps 105 together with either one or two electric motors may be mounted directly on the frame 1 of the handler. The control unit then functions either to control individual electric motors in a similar way to that described with reference to FIG. 4 or alternatively to control the individual pumps, e.g. by means of Bowden cables.

Although, as described originally, a handler in accordance with the invention is designed for use with the twin nose-wheels of an aircraft, it may, in practice, be fitted to any pair of twin aircraft wheels. Thus some helicopters have main wheels in the form of two pairs of twin wheels and handlers in accordance with the invention may thus be used, one for each pair of twin wheels, steering being by way of a manually operated steering arm attached to the nose wheel assembly.

I claim:

1. Apparatus for manoeuvring twin nose-wheeled aircraft, said apparatus comprising a frame, at least one pair of ground wheels supporting said frame, means for fitting said frame to the wheel-supporting structure of an aircraft, a pair of driving drums, means mounting said drums to turn in said frame, said mounting means comprising means whereby said drums are slidable between a first position in frictional engagement with respective wheels of said aircraft and a second position in frictional engagement with said at least one pair of ground wheels, a source of power providing independent drive to said two drums, a separate control unit and a flexible connection connecting said unit to said frame, whereby said two drums may be controlled.

2. Apparatus as claimed in claim 1 comprising means for pivotally connecting one end of said frame to turn about the axis of said aircraft wheels, and means connected to said drum mounting means for swinging said frame about said axis to lift said ground wheels clear of the ground whenever said drums are slid to their first position.